Figure 1:
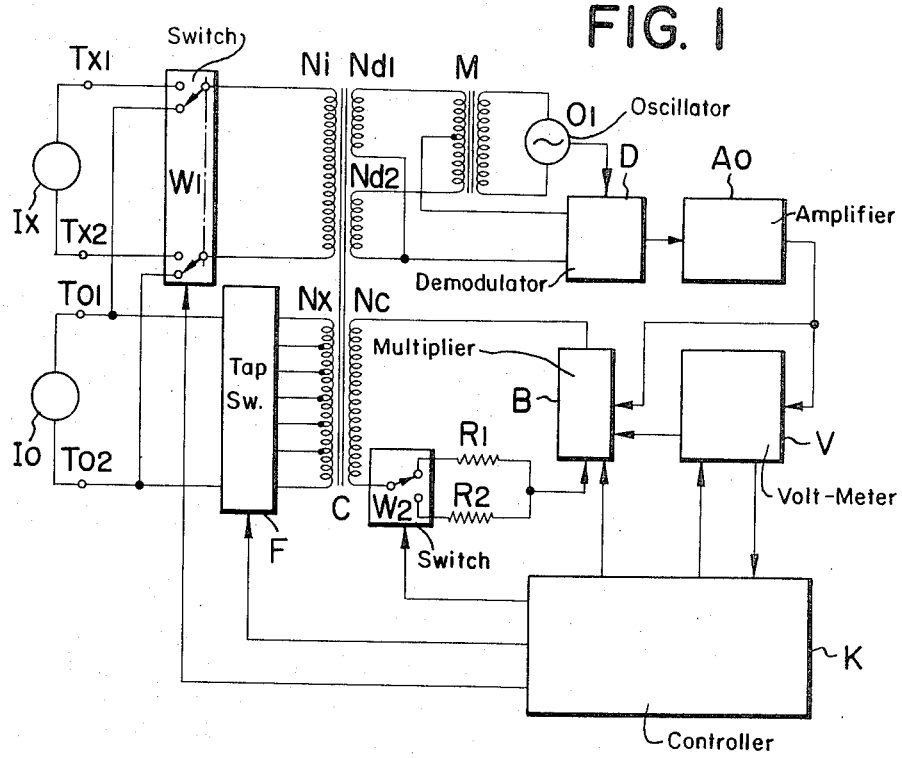

United States Patent [19]

Takeda et al.

[11] 3,798,543

[45] Mar. 19, 1974

[54] DIRECT CURRENT RATIO MEASURING APPARATUS

[75] Inventors: Ikuo Takeda; Takashi Suzuki; Hikaru Furukawa, all of Tokyo, Japan

[73] Assignee: Takeda Riken Industry Company Limited, Tokyo, Japan

[22] Filed: Dec. 18, 1972

[21] Appl. No.: 316,011

Related U.S. Application Data

[63] Continuation-in-part of Ser. No. 81,296, Oct. 16, 1970, abandoned.

[52] U.S. Cl. .............................................. 324/140 D
[51] Int. Cl. ................................................ G01r 7/00
[58] Field of Search....... 324/140 R, 140 D; 328/161

[56] References Cited
UNITED STATES PATENTS
2,919,067  12/1959  Boyd.............................. 324/140 D Primary Examiner—Alfred E. Smith
Attorney, Agent, or Firm—William J. Daniel

[57] ABSTRACT

This invention relates to a direct current ratio measuring apparatus wherein the current ratio is determined by first making a reference current and then making an unknown current to be measured flow through an input winding wound on a magnetic core of high magnetic permeability and in each case automatically cancelling out the flux in the core by introducing cancelling currents into another winding on the core, these cancelling currents being measurable to determine the ratio without introducing errors therein as occurs if an attempt is made to directly measure the reference and unknown currents.

2 Claims, 3 Drawing Figures

3,798,543

DIRECT CURRENT RATIO MEASURING APPARATUS

This application is a continuation-in-part of copending application Ser. No. 81,296, filed Oct. 16, 1970, now abandoned.

This invention relates to an apparatus for accurately determining a ratio of direct currents particularly as a digital readout quantity.

For this purpose in a conventional apparatus, a reference current and an unknown current to be measured are made to flow to a resistance, the respective voltages across the ends of the resistance are measured with a digital voltmeter, and a current ratio is then calculated from these measured values. Such a system had the defects that the calculation is complicated and that, in case the impedance is low, the current value fluctuates with the composite load resistance. The present invention has for its object the provision of an apparatus wherein an unknown current is made to flow in a winding wound on a magnetic core, and the resulting magnetic flux of the magnetic core is detected and then cancelled out so that there is no danger of causing a fluctuation of the current value, and wherein a current ratio or current value can then be directly read out and, more particularly, may be determined as an extremely precise digital value.

Figure 2:
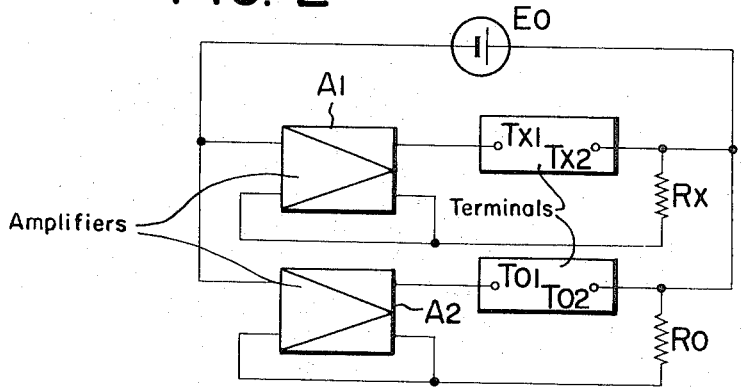
Figure 3:
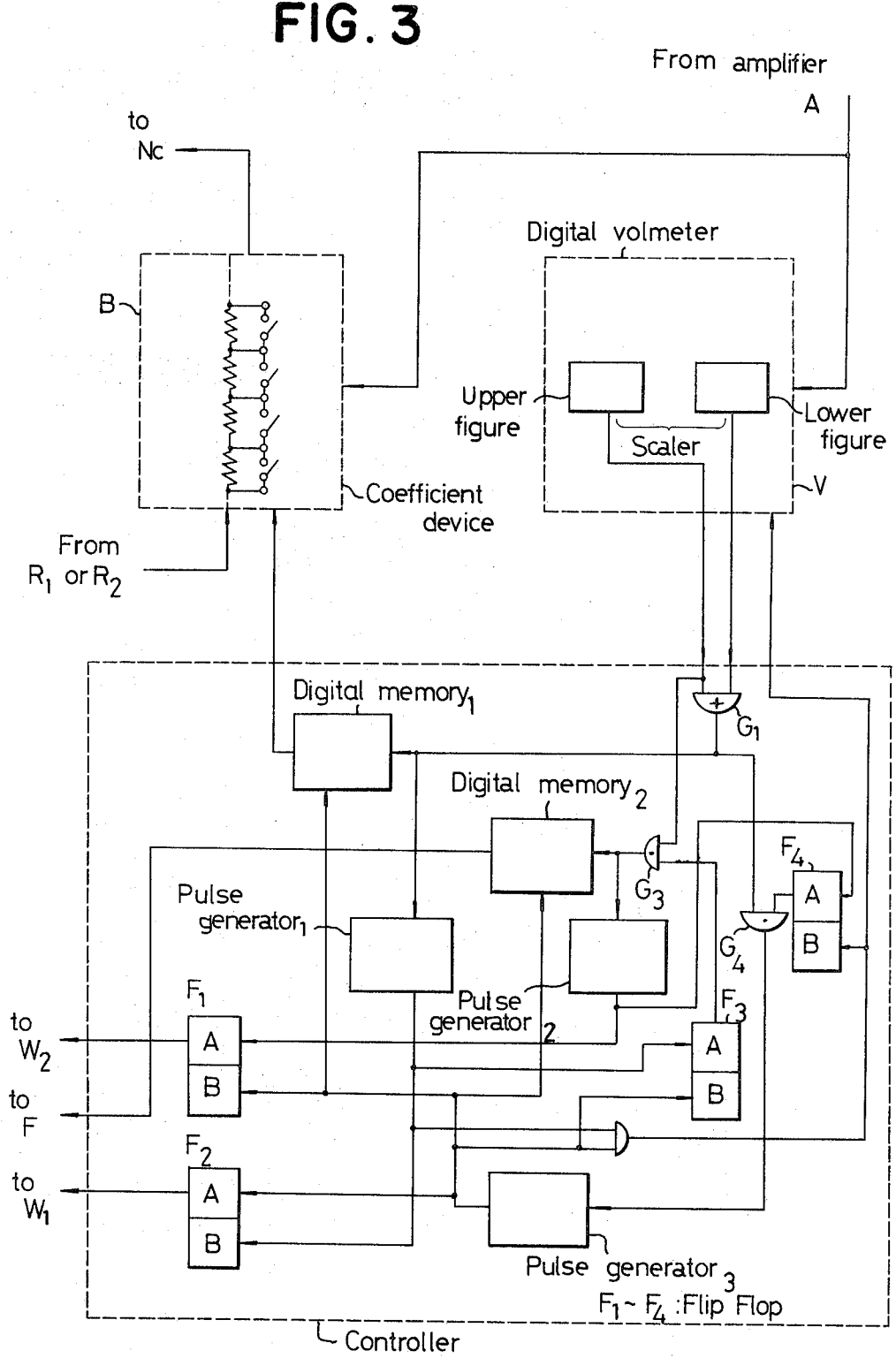

In the drawings:

FIG. 1 is a view showing the circuit of an embodiment of the present invention,

FIG. 2 is a view showing an auxiliary circuit of a type that can be connected to the input terminals of the circuit of FIG. 1 whereby a resistance ratio can be measured by using the current ratio measuring capability of the latter circuit, and FIG. 3 is a circuit diagram illustrating a multistep controller useful in the circuit of the invention and indicating the interconnection of the controller to the digital voltmeter and the coefficient multiplier.

In FIG. 1 showing an embodiment of the present invention, an input winding $Ni$, a selectable-turn winding $Nx$ having many taps, a magnetic flux cancelling winding $Nc$, and a pair of magnetic flux detecting windings $Nd_1$ and $Nd_2$ are all wound on a magnetic core C of a high magnetic permeability. The detecting windings $Nd_1$ and $Nd_2$ have equal numbers of turns and are connected in series opposition so that the output of an oscillator $O_1$ may be applied across the detecting windings $Nd_1$ and $Nd_2$ through a transformer M. The voltage between the center tap of the secondary winding of the transformer M and the common connection of the above-mentioned windings $Nd_1$ and $Nd_2$ is applied to a demodulator D so as to be demodulated together with the output of the oscillator $O_1$. Accordingly, in case no direct current magnetic flux is present in the magnetic core C, the impedances of the windings $Nd_1$ and $Nd_2$ will be equal to each other, and therefore no input will be applied by those windings to the demodulator D. However, when a direct current magnetic flux is present in the magnetic core, an unbalance will be produced and an input which is modulated in response to the direction of the magnetic flux will be applied to the demodulator D. When this modulated input is demodulated together with the output of the oscillator $O_1$, a direct current signal will appear at the output of the demodulator D which is of a polarity corresponding to the direction of the direct current magnetic flux in the magnetic core C. Thus, the combination of the oscillator $O_1$, transformer M and demodulator D comprises a flux detection device which detects a direct current magnetic flux in the magnetic core C and send out a direct current output signal with a polarity corresponding to its direction. This D.C. output signal is amplified by an amplifier $Ao$ and is applied to a digital voltmeter V and also to a multiplier device B which drives the flux cancelling winding $Nc$ through a resistance $R_1$ or $R_2$, whichever one is selected by the switching device $W_2$. Further, another switching device $W_1$ connects the input winding $Ni$ either to the terminals $TX_1$ and $TX_2$ of an unknown current source $Ix$ to be measured or else to the terminals $To_1$ and $To_2$ of a standard reference current source $Io$. Additionally, a tap switch F is used to connect the selectable-turn winding $Nx$ to the above terminals $To_1$ and $To_2$ as described hereinafter. The operations of the above-described switching means $W_1$, $W_2$ and F are controlled by a controller K which runs through a fixed sequence. The multiplier device B can be set to multiply the output signal voltage of the amplifier $Ao$ by any coefficient value before the multiplied output is applied in the series circuit of the winding $Nc$ and the resistance $R_1$ or $R_2$.

In the above-described apparatus, the first step of the controller K is to apply control signals to the switch F, such that the switch F is in an open state. At the same time in this first step, the switching device $W_1$ is activated to connect the input winding $Ni$ to the standard reference current source $Io$, and the switching device $W_2$ is activated to connect the winding $Nc$ to the multiplier device B through the resistance $R_1$. Therefore, the output direct current of the reference current source $Io$ flows through the input winding, and a direct current magnetic flux is generated in the magnetic core C. As a result, a direct current signal of a polarity corresponding to the direction of the magnetic flux is generated in the demodulator and applied to the amplifier $Ao$, and a current of such polarity as will cancel the above-mentioned magnetic flux will be introduced into the winding $Nc$ by the device B due to the output of the amplifier. If for the sake of brevity the resistance of the winding $Nc$ is neglected, then the number of turns of the respective windings, the output currents of the current sources, the value of the resistance, and the coefficient introduced by the multiplier device can be used to achieve balance in the circuit for this first step of the controller K. The coefficient introduced by the device B is set at 1 in the above first step and the amplifier $Ao$ delivers an output voltage $E_1$. A current $Ic_1$ equal to $E_1/R_1$ flows to the winding $Nc$, and then $$IoNi = Ic_1Nc \qquad (1)$$

is stabilized and established. If the amplification degree of the amplifier $Ao$ is large enough, in this first step, the magnetic flux of the magnetic core C will cancel out substantially completely. At the end of this first step, the digital voltmeter V measures the above-mentioned voltage $E_1$, and the controller K applies a second-step signal to the multiplier device B and switch $W_1$ and the multiplier device B changes from unity to a new coefficient equal to the voltage $E_1$, and the switching device $W_1$ is reversed to connect the input winding $N_1$ to the unknown current source $Ix$.

Therefore, the amplifier $Ao$ now delivers a new output voltage $E_2$ and a new current $Ic_2$ equal to $BE_2/R_1$ flows through the cancelling winding $Nc$, and the value $$IxNi = Ic_2Nc \quad (2)$$

is stabilized and established. The digital voltmeter V now measures this second-step voltage $E_2$. Then the controller K moves to the third step wherein it sets the tap switch F to a tap on the winding $Nx$ whose number of turns correspond most closely to the above-mentioned voltage $E_2$. Also in the third step the controller K switches the switch $W_2$ to select the scaling resistance $R_2$ for coupling the winding $Nc$ to the multiplier device B. By the operation of the above-mentioned switch F introducing turns of the winding $Nx$ across the terminals $To_1$ and $To_2$, a current $Io$ of such polarity will tend to cancel the magnetic flux introduced by the winding $Ni$ will flow in the winding $Nx$, and therefore the amplifier $Ao$ will now deliver a third voltage $E_3$ and also a current $Ic_3$ equal to $BE_3/R_2$ will now flow in the winding $Nc$, and $$IxNi = IoNx + Ic_3Nc \quad (3)$$

is stabilized and established. The digital voltmeter V then measures this voltage $E_3$ and finally indicates an output reading $Ex$, where +

$$E_2 + (R_1/R_2) E_3 = Ex \quad (4)$$

Moreover, since $BE_e/R_2$ can be replaced by $Ic_3$ in formula 3, and recalling that the coefficient B is set at $E_1$, the value of $Nc$ obtained from formula 1 can be substituted, and further the number of turns $Nx$ is equivalent to $E_3Ni$, then from the above-mentioned formula 3, $$Ix/Io = E_2 + (R_1/R_2) E_3$$

can be obtained. Moreover, by setting $R_1/R_2$ so as to be, for example, 1/1000, then a readout indication can be obtained where the value of the voltage $E_3$ measured with the digital voltmeter V is indicated as the lower three figures of the readout and $E_2$ is indicated as the next more significant figure above them, and the current ratio $Is/Io$ can be directly indicated by the above indicated value $Ex$. By the way, in the above-described embodiment, particularly, in order to make a precise measurement, the switching winding $Nx$ is provided with taps such that more significant figures and less significant figures may be measured in two steps. However, for an instrument where a less precise measurement is required, the current ratio $Lx/Io$ can be measured directly from the relation of the above-mentioned formula 12 without providing the tap-switching winding $Nx$ and resistance $R_2$.

Now a suitable controller K will be described with reference To FIG. 3. It is evident that the controller K is not, per se, a novel feature of the present invention but can be formed by combining known integrated logic circuits. In FIG. 3 there is illustrated in greater detail not only the multiplier coefficient device B and digital voltmeter V which were shown in FIG. 1, but also the details of a cooperating controller K. The multiplier device B consists of a group of resistances connected in series as shown in the drawing, and the contacts of the switches are connected in parallel so that they can shunt the respective resistance. In the first step, a unity coefficient is selected by a "zero" signal from the controller K and, in the second and third steps, a value corresponding with that measured with the digital voltmeter V in the first step is selected, the value having been retained by the digital memory 1 in the controller K in the first step. This setting is possible, for example, by the opening and closing of the contacts of a relay or by an electronic circuit. The digital voltmeter V is of a known ordinary type. In the case of making a precise measurement, as described above, the multiplier coefficient device B is divided into upper (more significant) figures and lower (less significant) figures. Moreover, since the voltmeter V is an ordinary digital voltmeter, it makes repeated measurements, automatically beginning the measurement, and then indicates the results of the measurement. However, as described later, the first step and the second step are initiated by the controller K.

First, each time a prior measurement has resulted in a digital signal from the scaler of the digital voltmeter V, the pulse generator 3 will start and will generate a pulse lasting for a fixed time. This pulse generator 3 comprises a one-shot multivibrator and is so designed as to generate only one pulse. The above described "fixed time" is selected to be longer than the repeating period of the digital voltmeter. The pulse from the pulse generator 3 is fed to the digital voltmeter V to start the measuring operation of the digital voltmeter and is fed to the digital memories 1 and 2 to reset their memorized values to a zero state and is fed to flip-flops $F_1$, $F_2$, $F_3$ and $F_4$. The flip-flop $F_1$ is used to control the switch $W_1$. Flip-flops $F_1$ and $F_2$ are connected to switch the contacts of the switches $W_1$ and $W_2$ to the lower side when pulses are fed to the side A of the flip-flop but to switch the contacts to the upper side when pulses are fed to the side B. Therefore, as the pulses from the pulse generator 3 are fed to the side B of the flip-flop $F_1$, the contact of the switch $W_2$ will be connected to the upper side, that is, the side $R_1$, and, as they are fed to the side A of the flip-flop $F_2$, the contact of the switch $W_1$ will be made to reverse to the lower side and the input winding $Ni$ will be connected to a reference current source $Io$. The digital memories 1 and 2 are reset and then memorize the digital signals from the voltmeter V. Once they memorize the digital signals, they will continue to send out these digital signals. Until they are again reset, they will accept no new digital signal.

When the digital memory 2 is reset to zero, a zero signal will be fed to the switch F to maintain the switch F in an off-state. On the other hand, the pulses from the pulse generator 3 are fed also to the side B of the flip-flops $F_3$ and $F_4$ and, when the flip-flops $F_3$ and $F_4$ are in this stage, the and-gates $G_3$ and $G_4$ will be blocked. Therefore, even if digital signals are sent out of the scaler of the digital voltmeter, they will be blocked by the gates $G_3$ and $G_4$ from being transmitted to the digital memory 2 and the pulse generator 3. When the pulse generator 3 sends out pulses as described above, the digital voltmeter V will begin a measuring operation to measure the output voltage $E_1$ of the amplifier $Ao$. The step continues until this measurement is completed in the above-described first step. Then, when the measurement is completed, digital signals corresponding to the output voltage $E_1$ of the amplifier $A_o$ will be sent out of the scaler of the digital voltmeter, will be memorized in the digital memory 1 through the or-gate $G_1$ and will at the same time trigger the pulse generator 1 to generate only one pulse. The digital memory 1 is set at $E_1$ to select the coefficient value of the multiplier coefficient device B. The pulse signals from the pulse generator 1 are fed to the side B of the flip-flop $F_2$ as shown in the drawing to reverse the flip-flop $F_2$. By this reversal, the contact of the switch $W_1$ is switched to the upper side to connect the input winding $N_i$ to the current source $I_x$. The above-mentioned pulse is also sent out to the side A of the flip-flop $F_3$ to reverse flip-flop $F_3$ and to enable the and-gate $G_3$. Further, the above-mentioned pulse is also fed to the digital voltmeter to actuate the beginning of the measuring operation of the voltmeter. Therefore, the digital voltmeter measures the output voltage $E_2$ of the amplifier $A_o$ then as described above. When this measurement is completed, the above-described second step will have been completed. The generated pulse is fed also to the flip-flop $F_4$. However, flip-flop $F_4$ is of a set-reset type so that although in the first step a pulse was fed to the side B, there was no change of the state.

The digitalized output voltage $E_2$ is fed to an and-gate $G_3$ from the scaler representing the upper (more significant) figures of the digital voltmeter V. Since the gate $G_3$ is opened, as described above, the digitalized output voltage $E_2$ will pass through the gate, will be memorized in the digital memory 2, and will at the same time trigger the pulse generator 2. The output of the digital memory 2 controls the switch F in FIG. 1 as described above to set the number of turns of switching winding $N_x$ to a value corresponding to the above-mentioned digitalized output voltage $E_2$. The triggered pulse generator 2 generates only one pulse which is fed to the flip-flops $F_1$ and $F_4$ to reverse them. Therefore, the contact of the switch $W_2$ will be made to select $R_2$, and the and-gate $G_4$ will be enabled. By the way, the digital signals of the upper (most significant) figures of the digital voltmeter V are fed also to the digital memory 1 through the or-gate $G_1$ but, since no reset signal has been fed to memory 1, as described above, it will continue to retain the previously memorized values. In this state, as explained in the overall operation described in FIG. 1, the amplifier $A_o$ will send out the voltage $E_3$, the digital voltmeter V will measure this voltage $E_3$ and will indicate the voltage $E_2$ in the upper (most significant) figures, and the voltage $E_3$ in the lower (less significant) figures. The completion of this operation is the completion of the third step. Therefore, with this indicated value $E_x$, the current ratio of $I_x/I_o$ can be directly read. Thus, with this digital signal, as the and-gate $G_4$ is opened, the pulse generator 3 will be started to return to its quiescent initial state.

The controller K and the apparatus of the present invention will then repeat the above operations. The above-described controller K is a mere example and is not, per se, an inventive component of the present invention. It can be very easily recognized by one skilled in the art that a controller K can also be achieved by sequencing the first, second, and third steps using, for example, a timing pulse generator. Incidentally, as previously explained, in case a precise measurement of the upper (more significant) figures and lower (less significant) figures is not required, it will not be necessary to provide the switching winding $N_x$ and resistance $R_2$, and the circuitry in the controller for activating the switching winding $N_x$ and resistance $R_2$ can be removed so that the controller K becomes a much simplier circuit.

FIG. 2 shows a circuit intended for connection to the terminals $T_{x_1}$, $T_{x_2}$ and $T_{o_1}$, $T_{o_2}$ in FIG. 1 and useful for the purpose of measuring the ratio of the resistances $R_x$ and $R_o$, the terminals in FIG. 2 having the same markings as the terminals in FIG. 1 to which they are connected. Hence, the outputs of the amplifiers $A_1$ and $A_2$ are applied respectively in series with the windings $N_1$ and $N_x$ and with the resistance $R_x$ or $R_o$. The reference voltage source $E_o$ is connected between one end of the resistances $R_s$ and $R_o$ and one input terminal of the amplifiers $A_1$ and $A_2$. Note that the circuit of the amplifier $A_1$ and the resistance $R_s$, and also that the circuit of the amplifier $A_2$ and resistance $R_o$ are respectively independently connected without providing any common ground point. Therefore, if the amplification degrees of the amplifiers $A_1$ and $A_2$ are large enough, the same voltage $E_o$ is applied across the resistances $R_x$ and $R_o$ thereby causing such currents to flow in the windings $N_i$ and $N_x$ as flow through the respective resistances via the terminals $T_{x_1}$, $T_{x_2}$ or $T_{o_1}$, $T_{o_2}$. Since the ratio of these currents in what is measured by the apparatus in FIG. 1 as explained above, the ratio of the resistances $R_s$ and $R_o$ can be readily determined from the measured value.

As explained above, the present invention is to determine a current ratio by making a known reference current and an unknown current to be measured flow through windings wound on a magnetic core of high permeability, and automatically controlling those currents so that the magnetic flux of the magnetic core will be cancelled. Therefore, the resistance of the circuit through which the current to be measured to flow is made negligible even in comparison wih the low source resistance. The current value is not likely to fluctuate and, by using the coefficient device B, the current ratio can be directly read from the voltmeter. Further, by providing the switching winding $N_x$ as is shown in the embodiment, a very precise measurement can be made.

In the embodiment illustrated, a magnetic flux detecting winding was used as the detector. However, the present invention can be accomplished also by other elements, for example, using such a flux detecting element as a Hall effect element.

What is claimed is:

1. Apparatus for measuring the ratio of an unknown direct current and a known reference current from a stable source, comprising a magnetic core; an input winding, a magnetic-flux cancelling winding, and a magnetic flux detecting element, the windings being wound on said core; means coupled to said flux detecting element to develop an output voltage of polarity and magnitude representative of the flux in the core; a coefficient multiplier device for multiplying said output voltage by a coefficient to generate a cancelling current and pass it through said flux cancelling winding to cancel the flux in the core; a voltmeter for measuring said output voltage; and multi-step controller means operative in a first step to set the coefficient multiplier device at unity and to introduce the known reference current into the input winding while the voltmeter reads the initial value of said output voltage required to cancel the flux in the core; said controller means being operative in a subsequent step to introduce said unknown current into the input winding and to set the coefficient multiplier device to multiply the resulting output voltage by a coefficient proportional to the initial value of said output voltage while the voltmeter reads the new value of output voltage required to cancel the flux in the core, said new value being proportional to the ratio of the unknown and the reference currents introduced.

2. A direct current ratio measuring apparatus according to claim 1 including a second magnetic flux cancelling winding having a variable number of turns, wherein while said unknown direct current is introduced into said input winding, and said new value of said output voltage required to cancel the magnetic flux in the magnetic core is read by the voltmeter, said multi-step controller means is operative in a third step to set the number of turns of said second magnetic flux cancelling winding at a value corresponding to the output voltage value resulting when said unknown current is introduced into said input winding, said first flux cancelling winding has a fixed number of turns and is connected to said coefficient multiplier device through a resistance, and said voltmeter measures and indicates said resulting output voltage value as a more significant figure and said new output voltage value as a less significant figure.

* * * * *

UNITED STATES PATENT AND TRADEMARK OFFICE
CERTIFICATE OF CORRECTION

PATENT NO. : 3,798,543
DATED : March 19, 1974
INVENTOR(S) : Ikuo Takeda et al

It is certified that error appears in the above—identified patent and that said Letters Patent is hereby corrected as shown below:

On the title page Insert

-- (30) Foreign Application Priority Data
    Oct. 17, 1969    Japan    82519/44 --.

Signed and Sealed this

Twenty-sixth Day of October 1982

[SEAL]

Attest:

Attesting Officer

GERALD J. MOSSINGHOFF

Commissioner of Patents and Trademarks